(12) United States Patent
Chandler et al.

(10) Patent No.: US 7,111,453 B2
(45) Date of Patent: Sep. 26, 2006

(54) EMISSIONS CONTROL

(75) Inventors: Guy Richard Chandler, Little Eversden (GB); Martyn Vincent Twigg, Caxton (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 11/098,875

(22) Filed: Apr. 5, 2005

(65) Prior Publication Data

US 2005/0166577 A1 Aug. 4, 2005

Related U.S. Application Data

(63) Continuation of application No. 09/623,447, filed as application No. PCT/GB99/00626 on Mar. 3, 1999, now Pat. No. 6,889,498.

(30) Foreign Application Priority Data

Mar. 6, 1998 (GB) ................. 9804739.2

(51) Int. Cl.
*F01N 3/00* (2006.01)
(52) U.S. Cl. ............... 60/288; 60/274; 60/295; 60/297; 60/311
(58) Field of Classification Search ............. 60/287, 60/288, 295, 297, 311; 423/213.7; 55/DIG. 30
See application file for complete search history.

(56) References Cited

U.S. PATENT DOCUMENTS 4,535,588 A   8/1985  Sato et al.
4,538,411 A   9/1985  Wade et al.
4,686,827 A   8/1987  Wade et al.
4,813,231 A   3/1989  Bykowski
4,923,487 A   5/1990  Bogart et al.
4,934,142 A   6/1990  Hayashi et al.
5,121,601 A   6/1992  Kammel
5,243,819 A * 9/1993  Woerner et al. ............. 60/274
5,248,482 A * 9/1993  Bloom ....................... 422/174
5,458,664 A  10/1995  Ishii et al.
5,551,231 A   9/1996  Tanaka et al.
5,571,298 A  11/1996  Buck
5,651,250 A   7/1997  Kawamura
5,746,989 A   5/1998  Murachi et al.
6,294,141 B1  9/2001  Twigg et al.

FOREIGN PATENT DOCUMENTS

DE  33 37 903 A1  5/1985
EP   0 341 832 A2  11/1989
EP   0 758 713 A1  2/1997
EP   0 758 713 B1  5/2001

OTHER PUBLICATIONS

International Search Report dated Jun. 16, 1999, from International Application No. PCT/GB99/00626.
British Search Report dated Jul. 7, 1998, from British Application No. 9804739.2.

* cited by examiner

*Primary Examiner*—Thomas Denion
*Assistant Examiner*—Diem Tran
(74) *Attorney, Agent, or Firm*—RatnerPrestia

(57) ABSTRACT

A cost-effective solution to remove particulates from diesel, especially light-duty diesel engines incorporates an oxidation catalyst (2) effective to convert NO in the exhaust from the engine to $NO_2$ and a particulate trap (4) which traps no more than 85% by weight of the particulate, optionally by permitting gas to by-pass the trap.

14 Claims, 2 Drawing Sheets

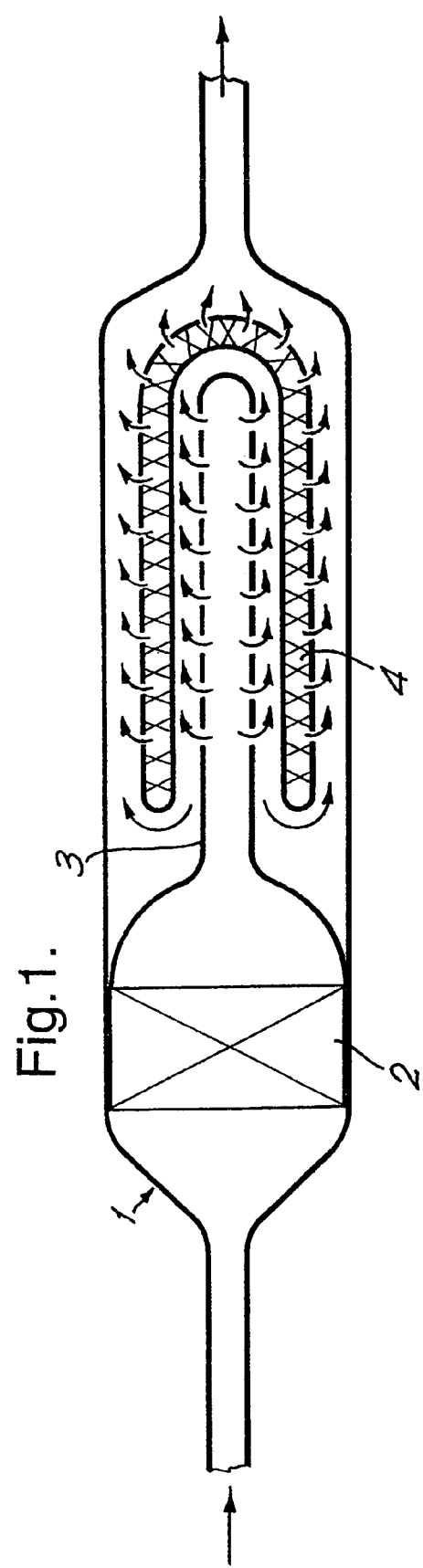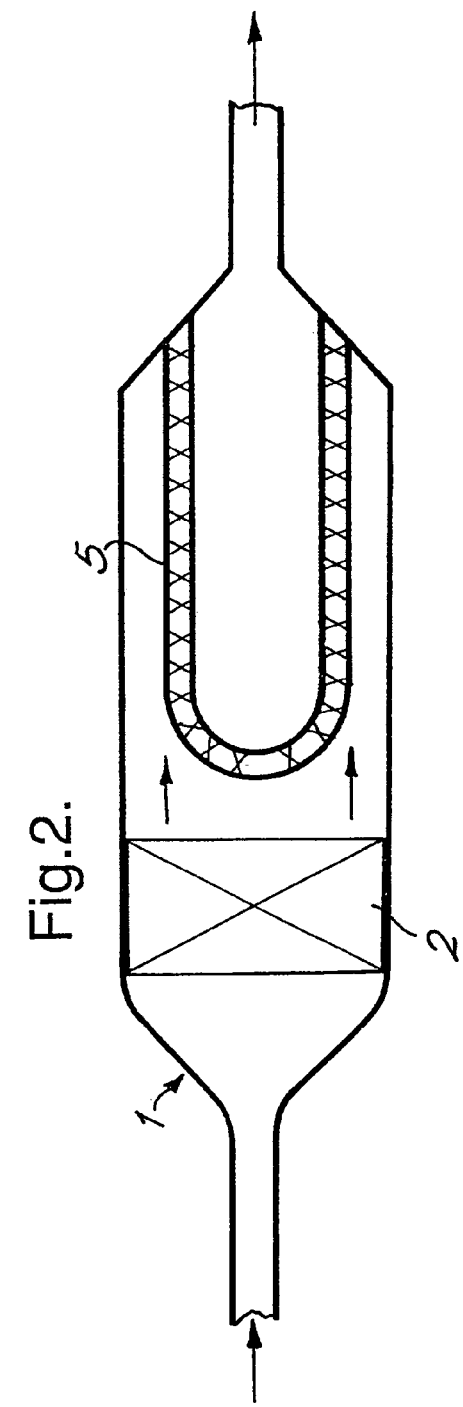

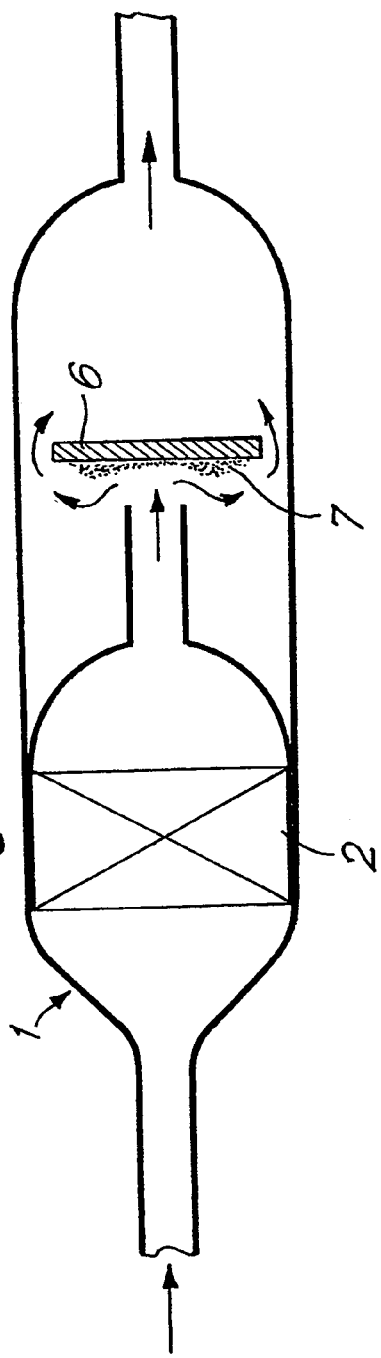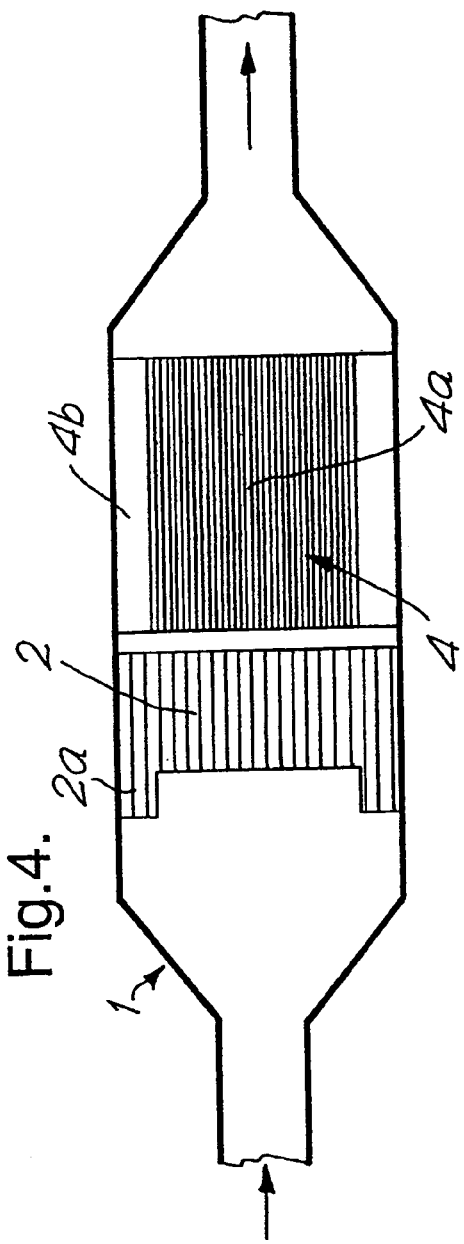

EMISSIONS CONTROL

This application is a continuation of U.S. patent application Ser. No. 09/623,447 filed Dec. 13, 2000 now U.S. Pat No. 6,889,498, which is the U.S. national phase application of International Application No. PCT/GB99/00626 Mar. 3, 1999, and claims priority of British Patent Application No. 9804739.2.

FIELD OF INVENTION

The present invention concerns improvements in emissions control, and more especially it concerns the control of emissions from diesel engines.

BACKGROUND OF INVENTION

Diesel engines fall into two main categories, namely heavy duty, being principally large engines for trucks, buses and prime mover vehicle engines, ships and boats and stationary engines, and light duty engines, used in smaller trucks and cars. With the increasingly demanding regulation of emissions from all sorts of engines, attention is now being paid to control of emissions such as particulates and $NO_x$ from diesel engines. We have, in EP 341,832, described a device marketed as the Continuously Regenerating Trap. ("CRT™") by Johnson Matthey. This device traps sooty particulates and causes their combustion by exposing them to $NO_2$ generally generated by catalytically oxidising NO present in the exhaust stream. This device has met with considerable success in controlling particulate emissions from heavy duty diesel engines, and can achieve zero emissions of particulate. That is, the CRT as marketed is approximately 100% effective to remove particulates (as defined in the regulations).

We have realised that a conventional CRT may not be cost-effective to control emissions to European Stage III, IV, or higher, regulations from light duty engines. A number of different options for controlling particulates and $NO_x$ are available, and engine manufacturers have hitherto favoured engine design and management solutions. In general, engine design itself can satisfy European Stage II emissions standards as regards $NO_x$ and particulates, but the characteristics of the diesel engine are such that engine design cannot improve upon about 0.4 g/Km particulates without a serious increase in $NO_x$, which is difficult to deal with under lean conditions. There still remains, therefore, a need for effective systems to meet these emissions regulations whilst increasing engine design options.

EP 0759713 (Toyota) describes an addition to the CRT principles, involving the absorption in a $NO_x$ absorbent of NO from gases leaving the CRT-type combination of oxidising catalyst and diesel particulate filter or trap, formed by one of the reactions of $NO_2$ with carbon particles.

SUMMARY OF THE INVENTION

The present invention provides an emission control exhaust gas aftertreatment apparatus for diesel engines comprising a source of $NO_2$, especially an oxidation catalyst effective to convert a portion of NO in the exhaust gas from said diesel engine into $NO_2$, and a particulate trap characterised in that an exhaust by-pass is provided so that a portion of the exhaust gases do not pass through the trap, such that at most 85% by weight of total engine-out particulates are collected and combusted in the presence of said $NO_2$ in said trap. According to various embodiments of the present invention, the quantity of particulates collected and combusted may be at most 85%, 60% or at least 50% by weight. It is, however, important that all particulates collected are combusted (over several operating cycles, but not necessarily over a single operating cycle), in order to avoid accumulation and blocking of the filter. The presence of the by-pass alleviates build-up of back pressure with consequent degradation of engine performance.

The by-pass may permit a portion of the exhaust gases to escape the trapping means either continuously or when substantial trapping of unburnt particulates has occurred. Desirably, the trapping means is designed to be "fail-safe," that is whilst it is effective to capture 50 wt % or more of sooty particulates under normal conditions, the trapping means decreases its collecting efficiency whether by exhaust gases by-passing the trapping means or otherwise, if the collecting means becomes "saturated" or clogged up. This concept is, we believe, new is diesel exhaust treatment systems.

The invention accordingly provides a method of controlling emissions, especially particulate matter, from diesel engine exhaust gases by trapping and subsequently combusting said particulate matter, comprising trapping at most 85 wt % of particulate matter in the presence of $NO_2$, and causing a portion of said exhaust gases to by-pass said particulate trapping means.

The source of $NO_2$ is especially conveniently an oxidation catalyst of generally known type, capable of converting at least a portion of the NO contained in diesel exhaust gases into $NO_2$. However, the present invention includes within its scope variation including other sources of $NO_2$. Such sources could include compressed $NO_2$, other chemical sources which decompose or react, possibly over a catalyst, to yield $NO_2$, such as nitric acid, ammonia, urea, etc. The invention includes within its scope all ways of making $NO_2$ from the components of the exhaust gases. These may include: adding one or more catalytic components to the fuel, so that the components deposit on exhaust components including the filter; catalysing the filter or parts thereof with catalysts active at low temperatures to convert NO to $NO_2$; utilising a plasma to generate $NO_2$ by treatment of all or a portion of the exhaust gases, and other methods available to the skilled person.

In the invention, the particulate trap, or trapping means, is designed to be less than 100% effective, and desirably this brings several advantages, the first of which is considerably reduced back pressure. Light duty diesels are very much less capable of coping with back pressure from exhaust gas systems than heavy duty diesels, because they tend to be of smaller capacity and power, and in extreme cases the engine can be ruined.

The present invention is also intended to cater for some of the problems that can arise in practical usage of light duty diesels. If such engines are used in small cars or vans which are used at low speeds in towns for large portions of their operations, the exhaust gas temperature tends to be quite low, perhaps not more that 100–120° C. Under these conditions, although sooty particulates are generated in less quantities than under heavy load, that temperature is below that for the most efficient oxidation of NO to $NO_2$ and hence there can be insufficient $NO_2$, or the reaction temperature is too low for effective combustion of the sooty particles. Accordingly, for many vehicles for much of the time, the trapping means should collect sufficient of the particles to meet the emission regulations, but using a design that collects such particulates for subsequent combustion when conditions are improved, and permits the exhaust gas to pass through without excessive back pressure. In such systems, at least 50 wt % of particulate matter is trapped and subsequently combusted when operating conditions in the same or subsequent operating cycles are improved.

It will be recognised that the prime purpose of the invention is to remove a proportion only of the particulates from the exhaust gas stream. This is intended to be adequate to meet the appropriate emission regulation when combined with engine design and management improvements. The reduced efficiency in collection of particulates of the present invention brings about a significant reduction of cost, however, from a reduced volume and weight for both the catalyst and the trap compared to the state of the art CRT designed for such an engine.

The oxidation catalyst may be any that is effective to convert sufficient NO to $NO_2$, and is suitably a high platinum loading catalyst carried on a ceramic or metal honeycomb catalyst support. It is envisaged that in addition to reducing volume and weight of the catalyst, savings may be made in precious metal loading, thus reducing the cost yet further.

The particulate trap may suitably be a woven or knitted wire mesh (illustrated in the exemplary embodiment of FIG. 5 by reference numeral 9) or perforated metal or a suitable ceramic material. Preferred traps include especially those known as wall flow filters. The trap is suitably designed for each individual engine design, because the particulate emissions differ significantly from engine to engine. The trap may, but need not, carry a catalytic coating intended to initiate combustion at lower temperatures.

Continuing development of the inventive concept of the present invention has led to studies of flow and pressure patterns within such exhaust treatment systems. A further embodiment of the invention, in which the trap has peripheral bypass through which the exhaust gases flow only when the central portion of the trap becomes blocked, is particularly preferred. The flow of the gases can be directed to the central portion as shown in FIG. 5 by a variety of means, including particularly baffle plates or cones, metal lips 8 and the like, but have found that extending the catalyst in the peripheral area is particularly simple and effective to reduce gas flow rates in that region.

A preferred embodiment of the present invention combines the emission control system with $NO_x$ control means. The $NO_x$ control may be achieved in a number of ways including exhaust gas recirculation, using a $NO_x$ conversion catalyst downstream of the trap or, more preferably, combining the trap system with a $NO_x$ absorbent. Such $NO_x$ absorbents are known to those skilled in the art and may utilise an alkaline earth metal oxide such as baria or calcia or other suitable materials. Together with the trap system of the present invention, such an absorbent can permit extremely useful control of emissions, for example up to about 80% removal of particulates combined with up to about 80% removal of $NO_x$. The $NO_x$ trap is desirably a single through-flow canister, which may be regenerated by periodic enrichment of the exhaust gas in a number of ways. In an even more preferred embodiment, the trap system of the invention is combined with the lean-$NO_x$ catalyst and a $NO_x$ trap. A particularly desirable embodiment is where the $NO_x$ trap is effective to trap the $NO_x$ at low temperatures and releases $NO_x$ at higher temperatures, e.g. about 250° C., at which temperatures $NO_x$ may more readily be converted and/or used in the particulate combustion of the present invention.

When using the presently-preferred platinum-based catalyst, the present invention should be used with fuel of not more that 50 ppm sulphur, and preferably below 50 ppm sulphur, more preferably below 10 ppm sulphur. Other catalyst systems may have a wider range of fuel sulphur levels.

BRIEF DESCRIPTION OF THE DRAWINGS

The invention may be better appreciated by reference to the accompanying drawings, in which:

FIG. 1 is a schematic cross-section of a first embodiment of the invention;

FIG. 2 is a schematic cross-section of a second embodiment of the invention;

FIG. 3 is a schematic cross-section of a further embodiment of the invention;

FIG. 4 is a schematic cross-section of a yet further embodiment; and

DETAILED DESCRIPTION OF THE INVENTION

Referring to FIG. 1, a canister is to be mounted in the exhaust system of a light duty diesel, e.g. a 1.9 liter Tdi engine. The canister, 1, contains an oxidation catalyst, 2, which is a platinum catalyst carried on a 100 cells/sq in metal honeycomb substrate. Particulate passes through the catalyst. A perforated gas distributor 3 is mounted downstream of the catalyst, and surrounding the gas distributor is a sintered stainless steel filter 4 which is located centrally within the canister. It can be seen that it is possible for the exhaust gases to by-pass the filter if the filter becomes clogged. Under ideal conditions, the filter collects sooty particles which are continuously combusted in the $NO_2$, generated by the catalyst, according to one or more of the equations:

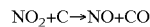

$$NO_2+C \rightarrow NO+CO$$

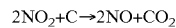

$$2NO_2+C \rightarrow 2NO+CO_2$$

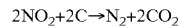

$$2NO_2+2C \rightarrow N_2+2CO_2$$

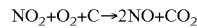

$$NO_2+O_2+C \rightarrow 2NO+CO_2$$

Under non-ideal conditions, that is at low exhaust gas temperatures, a portion only of the particulate is collected in the filter, and most of the exhaust gas by-passes the filter. Returning to higher exhaust gas temperatures permits the combustion reaction to re-start and the particulate can be totally removed from the filter.

Referring to FIG. 2, an embodiment is shown which permits substantial accumulation of particulate without by-pass, but using a filter 5 which is not 100% effective. The same items as in FIG. 1 are identified using the identical reference numerals. There is sufficient capacity to accumulate particulate under all normal operating conditions.

FIG. 3 utilises a slightly different by-pass design to that of the embodiment of FIG. 1. The particulate is collected by impingement of a baffle plate, 6, and is shown by mass, 7. The baffle plate is itself preferably porous to gas and acts as a filter. As exhaust gas temperatures rise, the not gases immediately contact the collected particulate and quickly cause combustion. This design may comprise electrical heating of the collection area on plate 6, creating a hot spot to initiate combustion. In a further design variation the baffle plate may comprise upstanding walls, giving a U-shaped cross-section.

A preferred embodiment is illustrated in FIG. 4. Engine exhaust gas passes through catalyst 2, which is provided with a peripheral lip 2a. The resulting increased resistance to flow in the peripheral region causes the majority of the gases to flow though the central, filtering, region of trap 4, (4a) rather than through the open peripheral bypass region (4b). Thus under normal operating conditions, negligible quantities of the exhaust gases bypass the filter, but if the filter becomes blocked with particulate, the system is fail-safe and the gases bypass the filter. Surprisingly low back pressures result from this system.

The above FIG. 4 embodiment was tested to a commercially available 1.9 liter Tdi car designed to meet European Stage II standards. After 1,000 road miles, the embodiment was tested according to the European Stage III test protocol. The following test results were obtained.

|  | HC (g/Km) | CO (g/Km) | NOx (g/Km) | PM (g/Km) |
| --- | --- | --- | --- | --- |
| Engine-out exhaust gas | 0.21 | 0.69 | 0.65 | 0.10 |
| With FIGURE by-pass filter | 0.02 | 0.03 | 0.62 | 0.02 |

It is to be noted that these results meet Stage IV requirements also, with the exception of $NO_x$. However, established engine design/management techniques can be used to lower $NO_x$ emissions to Stage IV levels, with a consequent increase in Particulate Matter, but the system of the invention is capable of dealing with such emissions.

It will be appreciated that there are many possibilities to vary the designs shown herein without departing from the principles of the present invention.

What is claimed:

1. An emission control exhaust gas aftertreatment apparatus for exhaust gases from diesel engines comprising a source of additional $NO_2$ and a particulate filter, which particulate filter comprises:
   a filter medium having sufficient capacity to accumulate particulates on the filter medium under all normal operating conditions,
   wherein said particulate filter is configured to trap no more than 85 wt % of engine-out particulates in the exhaust gas on said filter medium for combustion in the presence of said $NO_2$ in said particulate filter,
   wherein a portion of exhaust gases do not pass across said filter medium, and
   wherein the filter is configured to cause exhaust gases to continuously flow into the particulate filter during operation and the resulting exhaust gases to be passed to atmosphere.

2. The apparatus according to claim 1, wherein the particulate filter is configured to trap about 5 wt % or more of engine-out particulates.

3. The apparatus according to claim 1, wherein the filter medium comprises woven wire mesh.

4. The apparatus according to claim 1, wherein the filter medium comprises knitted wire mesh.

5. The apparatus according to claim 1, wherein the filter medium comprises perforated metal.

6. The apparatus according to claim 1, wherein the filter medium comprises a ceramic material.

7. A method of controlling emissions from diesel engine exhaust gases by trapping and subsequently combusting particulate matter, comprising:
   passing exhaust gases through a particulate filter configured to trap no more than 85 wt % of the particulate matter in the exhaust gases on a filter medium of the particulate filter, wherein a portion of the exhaust gases do not pass across the filter medium; and
   combusting said trapped particulate matter in the presence of $NO_2$ from a source of additional $NO_2$,
   wherein the exhaust gases continuously flow into the particulate filter during operation and the resulting exhaust gases are passed to atmosphere.

8. The method according to claim 7, wherein the trapping step comprises trapping between about 50 wt % to 85% wt of particulate matter in said exhaust gases on said filter medium.

9. An emission control exhaust gas aftertreatment apparatus for exhaust gases from diesel engines comprising a source of additional $NO_2$ and a particulate filter having a filter medium with a sufficient capacity to accumulate particulate under all normal operating conditions, wherein said filter medium is effective to trap no more than 85 wt % of engine-out particulates for combustion in the presence of said $NO_2$.

10. The apparatus according to claim 9, wherein the filter medium is effective to trap about 50 wt % to no more than 85 wt % of engine-out particulates.

11. The apparatus according to claim 9, wherein the exhaust gases continuously flow into the particulate filter during operation and the resulting exhaust gases are passed to atmosphere.

12. A method of controlling emissions from diesel engine exhaust gases by trapping and subsequently combusting particulate matter, comprising:
   trapping no more than 85 wt % of said particulate matter in said exhaust in a filter medium of a particulate filter by passing said exhaust gases across said filter medium, wherein said filter medium has sufficient capacity to accumulate particulate under all normal operating conditions in an amount of no more than 85 wt % of engine-out particulates; and
   combusting said trapped particulate matter in the presence of $NO_2$ from a source of additional $NO_2$.

13. The method according to claim 12, wherein the trapping step comprises trapping about 50 wt % to no more than 85 wt % of particulate matter in said exhaust in said filter medium.

14. The method according to claim 12, further comprising continuously flowing exhaust gases into the particulate filter during operation and the resulting exhaust gases are passed to atmosphere.

* * * * *

UNITED STATES PATENT AND TRADEMARK OFFICE
CERTIFICATE OF CORRECTION

| | |
|---|---|
| PATENT NO. | : 7,111,453 B2 |
| APPLICATION NO. | : 11/098875 |
| DATED | : September 26, 2006 |
| INVENTOR(S) | : Guy Richard Chandler et al. |

It is certified that error appears in the above-identified patent and that said Letters Patent is hereby corrected as shown below:

At column 2, line 31, delete "variation" and insert therefor --variations--.

At column 4, line 59, delete "not gases" and insert therefor --hot gases--.

At column 5, line 10, after "tested", insert --fitted--.

At column 5, line 21, after "FIGURE", insert --4--.

At column 5, line 52, delete "5 wt%" and insert therefor --50 wt%--.

Signed and Sealed this

Thirteenth Day of March, 2007

JON W. DUDAS
*Director of the United States Patent and Trademark Office*